United States Patent [19]

Crean et al.

[11] Patent Number: 4,751,517

[45] Date of Patent: Jun. 14, 1988

[54] TWO-DIMENSIONAL INK DROPLET SENSORS FOR INK JET PRINTERS

[75] Inventors: Peter A. Crean, Penfield; David B. Feldman, Rochester, both of N.Y.

[73] Assignee: Xerox Corporation, Stamford, Conn.

[21] Appl. No.: 10,100

[22] Filed: Feb. 2, 1987

[51] Int. Cl.[4] .......................... G01D 15/18; G02B 5/14
[52] U.S. Cl. .......................................... 346/75; 250/227
[58] Field of Search ............................ 346/75; 250/227

[56] References Cited

U.S. PATENT DOCUMENTS

| | | | |
|---|---|---|---|
| 4,255,754 | 3/1981 | Crean et al. | 346/75 |
| 4,328,504 | 5/1982 | Weber et al. | 346/75 |
| 4,498,004 | 2/1985 | Adolfsson et al. | 250/227 |
| 4,510,504 | 4/1985 | Tamai et al. | 346/75 |
| 4,550,322 | 10/1985 | Tamai | 346/75 |

*Primary Examiner*—E. A. Goldberg
*Assistant Examiner*—Gerald E. Preston
*Attorney, Agent, or Firm*—Robert A. Chittum

[57] ABSTRACT

Mounted at every other intersection of the deflection planes of the ink droplets issued by a multi-nozzle printhead of a pagewidth continuous stream ink printer are two-dimensional differential optical sensors. These sensors are located near the printing plane and gutters of the printer and comprise first and second input optical fibers, each having one end coupled to a common light source and the other free ends directing light towards aligned confronting free ends of respective associated pairs of output optical fibers. One of the input fibers and its associated pair of output fibers are inclined with respect to the other, though both input fibers and their associated pair of output fibers are either coplanar or contiguous with the same plane. The opposite ends of the pairs of output fibers are respectively coupled to differential circuits via photodetectors, so that each sensed droplet position may be determined relative to both the droplet deflection plane and the plane perpendicular thereto as the droplet travels along its flight path therepast.

3 Claims, 4 Drawing Sheets

TWO-DIMENSIONAL INK DROPLET SENSORS FOR INK JET PRINTERS

BACKGROUND OF THE INVENTION

This invention relates generally to optical sensing of droplets in continuous stream type ink jet printers and more particularly to two-dimensional differential optical sensors for sensing the position of ink droplets relative thereto while they are in flight.

Generally, ink jet devices of the continuous stream type employ a printhead having multiple nozzles from which continuous streams of ink droplets are emitted and directed to a recording medium or a collecting gutter. The printhead has an aperture plate with at least one row of nozzles or orifices through which the ink is ejected under pressure to form a row of parallel streams. The ink is stimulated prior to or during its exiting from the nozzles so that the stream breaks up in a series of uniform droplets at a fixed distance from the nozzles. As the droplets are formed, they are selectively charged by the application of a charging voltage by electrodes positioned adjacent the streams at the location where they break up into the droplets. The droplets which are charged are deflected by an electric field either into a gutter for ink collection and reuse, or to a specific location on the recording medium, such as paper, which may be continuously transported at a relatively high speed across the paths of the droplets.

Printing information is transferred to the droplets through charging by the electrodes, the charging control voltages are applied to the charging electrodes at the same frequency as that which the droplets are generated. This permits each droplet to be individually charged so that it may be positioned at a distinct location different from all other droplets or sent to the gutter. Printing information cannot be transferred to the droplets properly, unless each charging electrode is activated in phase with the droplet formation at the associated ink stream. As the ink droplets proceed in flight towards the recording medium, they are passed through an electric field which deflects each individually charged droplet in accordance with its charge magnitude to specific pixel locations on the recording medium. Thus, to calibrate the ink jet printer so that the ink droplets impact the desired locations on the recording medium, the trajectories of the ink droplets must be determined and adjusted.

U.S. Pat. No. 4,510,504 to Tamai et al discloses an ink droplet sensor for a multi-jet ink jet printer comprising a light emitter and a plurality of light receivers. In one embodiment, each nozzle for ejecting ink droplets has a light emitter that is to one side of the ink droplet flight path or trajectory and a set of light receivers on the other side of the droplet trajectory. The light reflected from a passing droplet to a one of the receivers of the set determines, in combination with the intensity of the reflected light sensed, the flight path or trajectory of the droplet. In another embodiment, the light emitter and at least one of the plurality of receivers are aligned with the droplet trajectory of each nozzle. The light emitters and receivers are mounted in a common base plate and are substantially coplanar with each other.

U.S. Pat. No. 4,328,504 to Weber et al discloses an optical sensor which travels with the drop-on-demand type ink jet printhead as it traverses across the recording medium in a horizontal direction while the recording medium is moved or stepped in the vertical direction. The optical sensor observes the actual pixel location on the recording medium and circuitry compares it to the desired location. Corrective measures are energized as required in accordance with the comparison signal.

U.S. Pat. No. 4,255,754 to Crean et al discloses the use of paired photo-detectors to sense ink drops, one each for two output fibers that are used to generate an electrical zero crossing signal. The zero crossing signal is used to indicate alignment or misalignment of a droplet relative to the bisector of a distance between two output fibers. The sensor of this patent employs one input optical fiber and at least two output optical fibers. The free ends of the fibers are spaced a small distance from each other; the free end of the input fiber is one side of the flight path of the droplets and the free end of the output fibers are on the opposite side. The remote end of the input fiber is coupled to a light source, such as an infra-red light emitting diode (LED). The remote ends of each output fiber are coupled to separate photodetectors such as, for example, a photodiode responsive to infra-red radiation. The ink is substantially a dye dissolved in water and is, of course, transparent to infrared light, thus reducing the problems of contamination usually associated with ink droplet sensors. The photodiodes are coupled to differential amplifiers so that the output of the amplifiers are measurements of the location of droplets relative to the bisector of the distance between the output fiber ends confronting their associated input fibers and droplets passing therebetween. Amplifier outputs are used in servo loops to position subsequently generated droplets to the bisector location. The zero crossing may be used, depending upon its orientation with respect to the droplet stream direction, as a time reference to measure the velocity of the drop. Therefore, the droplet velocity information may be used in a servo loop to achieve a desired velocity. The patent to Crean et al therefore discloses sensing the ink droplets in the plane of their travel and deflection.

Using an orthogonal coordinate system, the trajectory of the droplets from the nozzle to the recording medium is the Z axis, and the deflection of the droplets by the deflection field is the X axis. The direction of the droplet out of this XZ plane is the Y direction, and as disclosed in this patent, an ink droplet passing exactly through the bisector of the two output or receiving fibers cannot detect a misalignment in the Y direction. This is because each of the output fibers receive equal amounts of light from the input fiber regardless of whether the ink droplet is above or below the desired deflection plane of the ink droplets. By using one of these zero crossing signal detectors at a location between adjacent end most droplets thrown from separate adjacent nozzles, the stitch point between these droplets can be controlled so that the segments of each line of droplets to be printed by each nozzle may be adjusted to prevent gaps or overprinting on the recording medium. However, no sensing and control of the droplets above or below the desired deflection plane of the droplets concurrently with the sensing and control of the droplets in the XZ plane is possible with this configuration.

Therefore, a need remains for two-dimensional sensing of the ink droplets in order to control the misalignment of droplets above or below the deflection planes, as well as the misalignment of the droplets within such planes and such a sensor is the subject of the present invention.

SUMMARY OF THE INVENTION

It is the object of the present invention to provide a two-dimensional optical ink droplet sensor capable of sensing the location of a droplet in both the deflection plane as well as its location above or below such deflection plane.

In the present invention, the droplet monitoring is accomplished by optically sensing the droplet as it passes the two-dimensional, differential sensing sensor of the present invention, after its flight through the deflection field and before its arrival at its target position on the recording medium or the collecting gutter. This is accomplished by combining the single dimensional, differential sensor of U.S. Pat. No. 4,255,754 to Crean et al which monitors the droplet position in the deflection plane with another single dimensional differential sensor inclined at a predetermined angle with the first sensor in order to concurrently monitor the droplet position in both the sagittal plane and the deflection plane. The deflection plane is defined by the sweep of ink droplets from each of the nozzles in a printhead of pagewidth printer, while the sagittal plane is defined by the misposition of the ink droplet above or below the deflection plane. Thus, the sagittal plane is substantially perpendicular to the deflection plane. The two differential sensors are either coplanar or they are contiguous with but on opposite sides of a plane perpendicular to that of the deflection plane of the ink droplets. The additional inclined sensors may be positioned with their optical axis crossing the deflection plane of the droplets and in the center of each sweep of droplets from each nozzle or at the edges thereof. In the preferred embodiment, the sagittal direction sensing sensor is located at the extreme ends of the droplet sweeps so that these inclined sensors can be shared by adjacent streams of droplets, thus halving the number required. The combination of the two sensors provide both the data needed to correct for the stitch or deflection plane error as well as the sagittal or out of plane misdirection and both errors in position can be compensated for in the imaging electronics within the ink jet printer controller. The controller then adjusts the voltages applied to the droplets by the charging electrode.

A more complete understanding of the present invention can be obtained by considering the following detailed description in conjunction with the accompanying drawings.

DESCRIPTION OF THE PREFERRED EMBODIMENT

Figure 1:
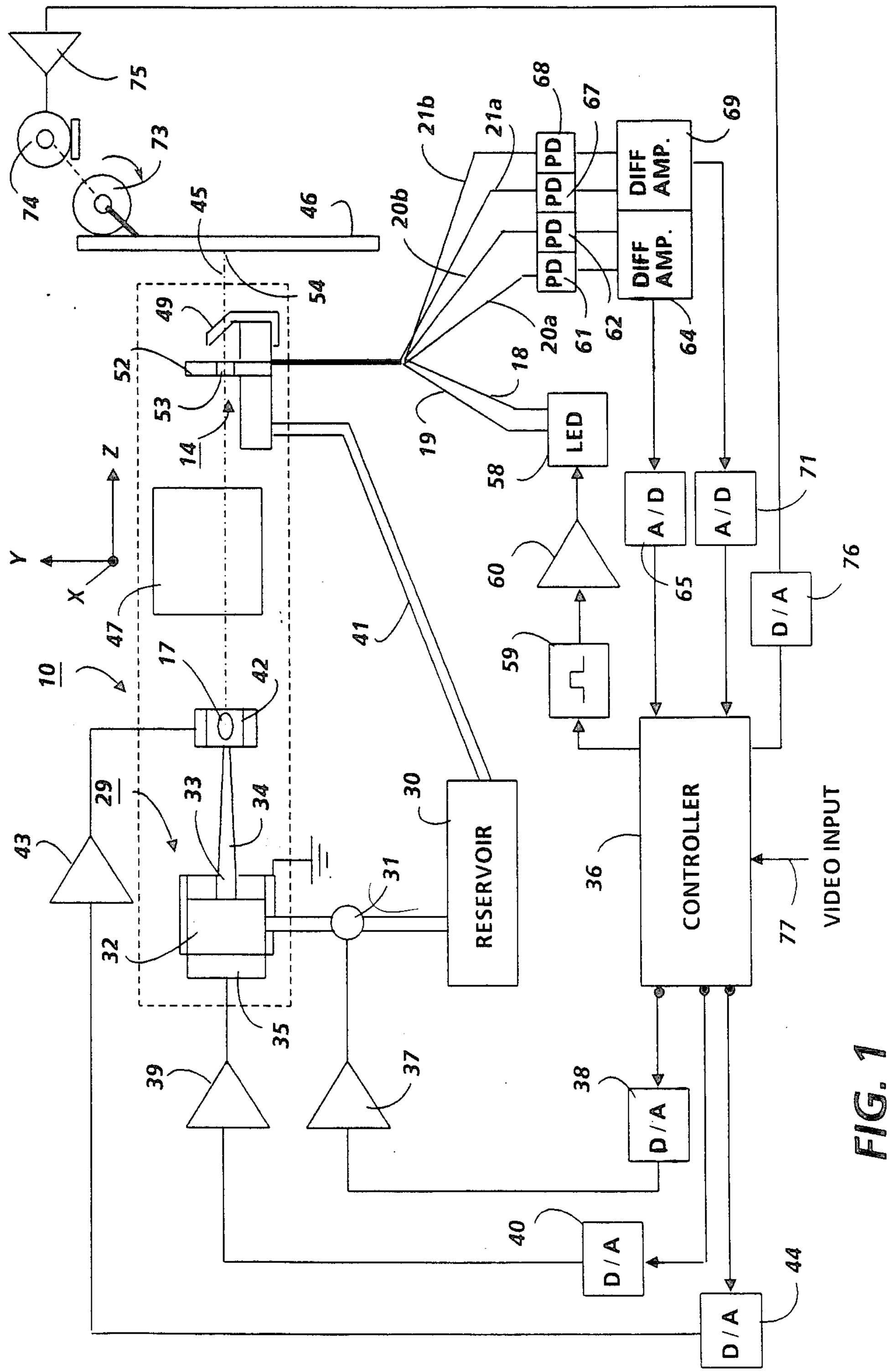
FIG. 1 is an elevation view in schematic form of a pagewidth printer printhead using multiple droplet position sensors according to the present invention.

Referring to FIG. 1, a continuous stream ink jet printing system is depicted employing a plurality of the position sensors of the present invention. A fluid ink contained in reservoir 30 is moved by pump 31 into the manifold 32 of an ink droplet generator 29 of the printhead 10 shown in dashed line. The manifold includes a plurality of nozzles 33 which emit a continuous stream of ink 34. Droplets 17 are formed from the stream at a finite distance from the nozzle due to regular pressure variations imparted to the ink in the manifold by a piezoelectric device 35. The piezoelectric device is driven at a frequency in the range of from 100 to 300 kHz which gives rise to a stream of droplets 17 that are generated at the frequency of the piezoelectric device. The pressure of the ink in the manifold is controlled by the pump 31 and establishes the velocity of the droplets 17. The pressure variations introduced by the piezoelectric device 35 are small but are adequate to establish the rate of drop generation. Both the velocity and droplet frequency are under the command of a micro-computer or controller 36. Droplet velocity is controlled by regulating the pump to appropriately increase or decrease the ink pressure in the manifold 32. The controller communicates with the pump 31 via amplifier 37 and digital-to-analog (D/A) converter 38. The controller communicates with the piezoelectric device by means of the amplifier 39 and D/A converter 40.

A charging electrode 42 for each nozzle is located at the position where a droplet 17 is formed from the stream 34. The charge electrodes are also under the control of the microprocessor 36. The electrodes 42 are driven by means of an amplifier 43 and a D/A converter 44 coupled to electronic circuitry within the controller which generates the appropriate voltage. The function of the charging electrodes is to impart a net positive or negative charge to a droplet 17. The fluid is conductive and is electrically coupled to ground through the manifold 32. When a voltage is applied to an electrode 42 at the instant of droplet formation, the droplet assumes a charge corresponding to the voltage applied to the electrode. In the embodiment illustrated in FIGS. 1 and 2, uncharged droplets follow an undeflected flight path 45 to the recording medium 46. Charged droplets are deflected left and right of path 45 and in the XZ plane depending upon the sign of the charge. The XZ plane is determinable from the X, Y, and Z coordinate system shown in FIG. 1. Predetermined values of positive charge for a droplet 17 will cause it to follow a path that directs it into a gutter 49 located to the right or left of the centerline paths 45. The ink collected in gutter 49 is returned to the reservoir via conduit 41.

As discussed more fully later with respect to FIG. 3, the nozzles of the printhead each employ a two-dimensional differential optical sensor 14 which is a subject of the present invention and a position sensor 13 of the type described in U.S. Pat. No. 4,255,754 to Crean et al. Accordingly, this patent is hereby incorporated by reference. Both the two-dimensional sensors 14 and the single dimension sensors 13 described in the Crean et al patent are mounted on a sensor support board 52. The support board has an aperture 53 that permits the droplets 17, emitted by the nozzles, to pass therethrough and be either collected by gutter 49 or impact the recording medium 46. A charged droplet is deflected due to a static electric field between left and right deflection plates 47 and 48 associated with each nozzle. The deflection plates 47 have very high voltages coupled to them while the deflecting plates 48 are grounded, as indicated by the +V and ground symbols shown in FIG. 2, to create the deflection fields. The potential difference between the deflection plates is generally in the magnitude of 2,000 to 3,000 volts. The magnitude of the voltage applied to the charging electrode 42 is generally in the range of +200 to −200 volts.

Figure 2:
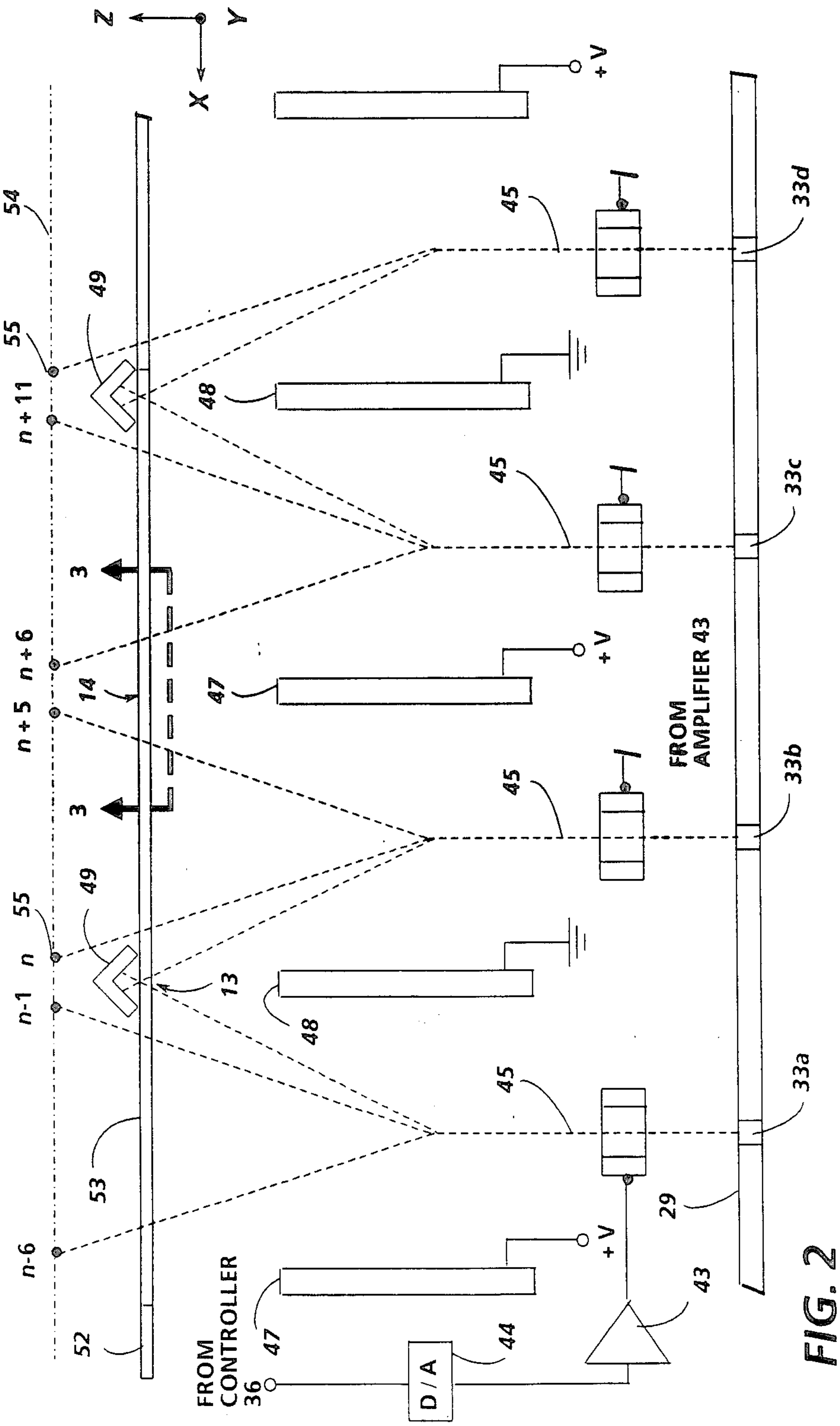
FIG. 2 is a plan view in schematic form of a major portion of the ink jet printer of FIG. 1 illustrating the multiple nozzle and sensor layout.

Referring to FIG. 2, the gutters 49 are shown located at about half the distance between every two nozzles and downstream from the grounded deflection plate 48. Accordingly, adjacent nozzles are able to have droplets deflected to the same gutter, so that there are only one gutter 49 for each two nozzles. Likewise, a position sensor 13 is located on the support board 52 near each of the gutter locations, so that a position sensor is shared by adjacent nozzles. Each nozzle also has a two-dimensional position sensor 14, which is the subject matter of the present invention, located on the support board 52 downstream from charged deflection plate 47. This two-dimensional sensor is shared by two adjacent nozzles and, as stated above, each nozzle has a prior art single position sensor for sensing the endmost droplets on one end of its sweep of droplets and a two-dimensional position sensor for the endmost droplet at the other end of its sweep of droplets.

Each of the plurality of nozzles is responsible for placing a sweep of droplets at some finite number of lineal pixel positions on the recording medium at the printing line 54. The dots 55 represent the pixels or picture elements in a row which are the impact targets for the droplets passing through the deflection fields. The deflection fields sweep the droplets along a nominal deflection plane to print a single line of pixels across the width of the recording medium. Each nozzle is responsible for a segment of the pagewidth line. Nozzle **33*b* is responsible for placing a droplet at each of the N through N+5 pixel locations on the printing plane 54 which is the surface of the recording medium as shown in FIG. 1. The adjacent nozzle 33*a* is responsible for placing droplets at pixel locations N−1 through N−6. Similarly, nozzle 33*c*** is responsible for placing droplets at the N+6 through N+11 pixel positions and so on. When the droplets from adjacent nozzles are in fact aligned to adjacent pixel positions such as the N and N−1 positions or N+5 and N+6 positions, the droplets from the nozzles are said to be stitched together.

By stitching it is meant accurate placement of adjacent endmost droplets from two separate but adjacent nozzles on the recording medium. The printed pixels are stitched if they are substantially without gap or overlap and are not above or below the droplet deflection plane 70 (see FIG. 3). The prior art stitch sensors 13 are one dimensional sensors which are built at the edge of each droplet deflection scan or sweep from each nozzle, giving N+1 stitch sensor sites for N nozzles. Since only one droplet position with respect to the above or below the deflection plane per nozzle is required, an additional inclined sensor may be combined with one of the one dimensional prior art sensors at a stitch point to form the two-dimensional differential sensor 14, where they can monitor the droplet trajectories of two adjacent nozzles. This combination of prior art stitch sensor and an inclined sensor provides a two-dimensional sensor capable of monitoring and correcting the sensed droplet trajectory in both the deflection plane and above or below it. Using the X, Y, and Z coordinate system as shown in the drawings, the position error in the deflection plane (i.e., XZ plane) is plus or minus ΔX and the position error above or below the deflection plane is ΔY (i.e., droplet position correction within the XY plane). The inclined position sensor is positioned so that the refracted light crosses the droplet trajectory to be monitored is at an angle $\theta$ with respect to its associated vertical position sensor; this angle $\theta$ is preferably between 30 and 45 degrees. Since a nozzle need only see one two-dimensional sensor 14 and each two adjacent nozzles may share one, then only N/2+1 two-dimensional sensor sites are required for a printhead having N nozzles. Accordingly, the preferred embodiment of a continuous stream pagewidth printer uses N/2+1 two-dimensional sensors 14 of the present invention and N/2 one dimensional prior art stitch sensors 13.

Each two-dimensional sensor 14 is a combination of one prior art sensor and a similar sensor inclined at an angle relative thereto and each sensor is part of a servo loop which adjusts the voltage applied to the charging electrode 42 until the droplets from two adjacent nozzles pass exactly under the bisector of both the vertical or stitch sensor (i.e., droplet position within the XZ deflection plane) and the inclined sensor, (i.e. droplet position within the XY plane) which together form the two-dimensional position sensor of the present invention. Referring to FIG. 1, the position servo loop includes the controller 36, light source 58, photodetectors 61, 62, 67, and 68, and differential amplifiers 64, 69. The light source 58 which may be one or more LED's, is electrically coupled to the controller 36 via the amplifier 60 and pulse generator 59. The position servo, as is well understood in the art, operates to reduce any ΔX or ΔY error signals to zero. When the droplets sensed by the two-dimensional sensor pass directly under the bisector of the portion thereof checking droplet location within the deflection plane and directly under the bisector of the portion checking droplet location within the XY plane (also referred to as the sagittal plane or sagittal direction), these droplets are accurately aligned at the stitch point with respect to two dimensions, as more fully discussed with reference to FIG. 3 later. The position servo loop for the alignment of a droplet to the bisector of each portion of the two-dimensional sensor is the same for each one mounted on the support board 52, so the description of the operation of one will suffice as a description for all. In fact, the light source of LED, the photodiodes or photodetectors, and related circuitry are shared in a similar manner to that disclosed in the above-mentioned U.S. Pat. No. 4,255,754 to Crean et al.

Figure 3:
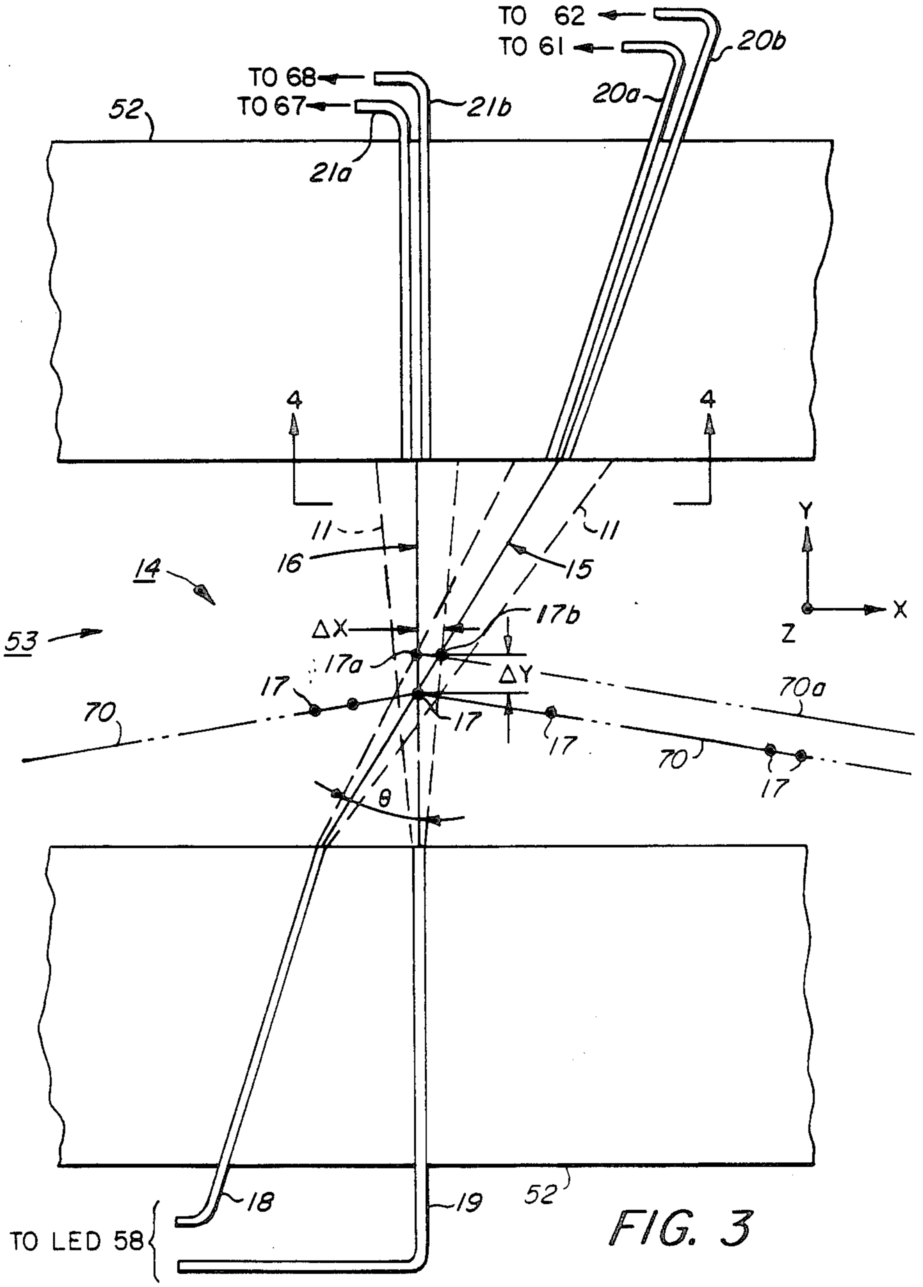
FIG. 3 is an enlarged schematic of the two-dimensional, differential optical sensor of the present invention as viewed along line 3—3 of FIG. 2.

FIG. 3 shows an enlarged partial schematic view of the sensor support board 52 taken along view line 3—3 of FIG. 2. The X,Y, and Z coordinate axis is illustrated for convenience. The support board 52 includes an aperture 53 in the XY plane to allow the droplets moving in the Z direction (i.e. into the plane of the drawing) to pass through the board aperture 53 towards the print line 54 on the recording medium 46 (not shown). The points 17 indicate the droplets issued from the nozzles 33 of the droplet generator 29 of FIGS. 1 and 2.

The two-dimensional, differential sensing sensor 14 of the present invention is illustrated in FIG. 3. It has first and second input optical fibers 18 and 19, though any light transmissive optical channels may be used such as, for example, wave guides made by photopolymer treatment or epoxy filled channels (not shown). One end of the input fibers are coupled to a light source or LED 58 and the other free ends each direct a cone of light 11, shown in dashed line, through the deflection plane 70 of the droplets from two adjacent nozzles. To account for movement of the recording medium in the +Y direction, the nominal deflection plane 70 is at a slight incline to the XZ plane. Thus, the droplets which impact the recording medium earlier and later than the center droplets still form a straight line thereon.

Associated with inclined input fiber 18 is a pair of inclined output fibers 20a and 20b. The ray of light striking the bisector of this pair of output fibers is called the null position ray trace and is identified by index numeral 15. Associated with vertical input fiber 19 is a pair of output fibers 21a and 21b, with a vertical null position ray trace 16. The free ends of the input fibers are confrontingly aligned and spaced from the free ends of their associated pairs of output fibers. The free ends of the input fibers and associated pairs of output fibers are separated by the ink droplet deflection plane 70. The input fiber 18 and associated pair of output fibers 20a and 20b are inclined to the input fiber 19 and its associated pair of output fibers 21a and 21b. The inclination of the input fiber 18 and its associated pair of output fibers to the input fiber 19 and its associated pair of output fibers is such that the null position ray trace 15 is at a predetermined angle $\theta$ with the null position ray trace 16. In the preferred embodiment, this angle is between 30 and 45 degrees. In an alternate embodiment (not shown), two inclined input fibers and associated pairs of output fibers are inclined with respect to each other, so that their respective null position ray traces are inclined in opposite but equal angles between 30 and 45 degrees relative to the XZ plane.

Referring to FIG. 1, all of the optic fibers 20a are bundled and coupled to a photodetector or photodiode 61, the bundle of output fibers 20b is coupled to photodetector 62, the bundle of output fibers 21a is coupled to the photodetector 67 and the bundle of output fibers 21b is coupled to photodetector 68. The photodetectors 61 and 62 are coupled to a differential amplifier 64, while the photodetectors 67 and 68 are coupled to differential amplifier 69. The error signals from the differential amplifier 64 is coupled to controller 36 through analog to digital (A/D) converter 65. The error signals from differential amplifier 69 is coupled to the controller via A/D converter 71. Trajectory plane 70a refers to a droplet stream or jet trajectory that is misdirected above the nominal desired plane 70 and intersects the centerline or null ray traces 16, 15 at 17a and 17b, respectively. Referring to FIG. 3, the $\Delta X$ is a measure of the horizontal distance between the two null ray traces striking the droplet sensed, and is calculated from the charge voltages required to null amplifiers 64 and 69, the charge voltage required for the proper droplet trajectory at the position sensors 13 at the other side of the nozzle channel, and the channel width; e.g., the distance between pixel n and pixel n+5. The saggital error $\Delta Y$ is related to the $\Delta X$ by geometry, i.e., the inclination of the sensed droplet to the X-axis and the angle $\theta$ between the fibers 18, 19. $\Delta Y$ is calculated from $\Delta X$ using trigonometric relationships.

After all of the nozzles have been adjusted for stitching and sagittal alignment, correct phase, and drop velocity, the printing operation is ready to begin. The recording medium 46 is moved in the +Y direction in the XY plane according to the X, Y, and Z coordinates shown in FIG. 1. The drive wheel 73 is shown in the operative position to transport the recording medium in the +Y direction. The drive wheel is mechanically powered by an electric motor 74. The motor is under the control of the controller 36 by virtue of the amplifier 75 and digital to analog conveter 76. Video information is fed into the controller 36 as indicated by arrow 77. The video information is buffered, but not to compensate for paper speed or droplet generation rate. The droplet generation and paper speed are matched by the paper servo to assure the correct resolution. The data is buffered a little bit for several scan lines, and droplet streams or jets have their data selectively delayed in accordance with their measured sagittal error. The lowest pointing jet is least delayed; higher shooting jets have their data delayed so that the printed image from the lowest jet will have moved up to their position (assuming paper is moving up from the XZ plane).

The printing or recording process begins by the controller 36 issuing a command to motor 74 to start moving the recording medium 46 past the printing line 54. The plurality of nozzles issue presurized ink streams 34 which break up into droplets 17 at the charge electrodes 42 which are simultaneously fed video information from the controller that causes the drops to be charged by the charging electrodes to a value to place them at the desired positions covered by the nozzle. The movement of the recording medium in the XY plane propagates a row of drops over the recording medium to achieve the creation of the entire raster image.

Figure 4:
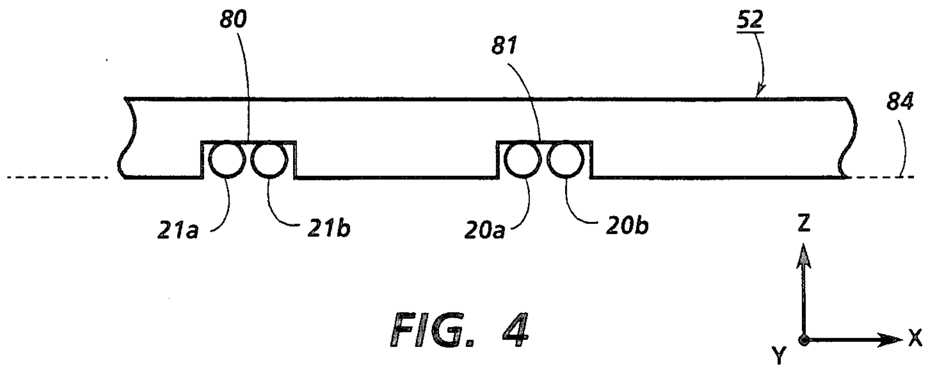
FIG. 4 is a schematic view of the output optical fibers of as viewed along view line 4—4 of FIG. 3.
Figure 5:
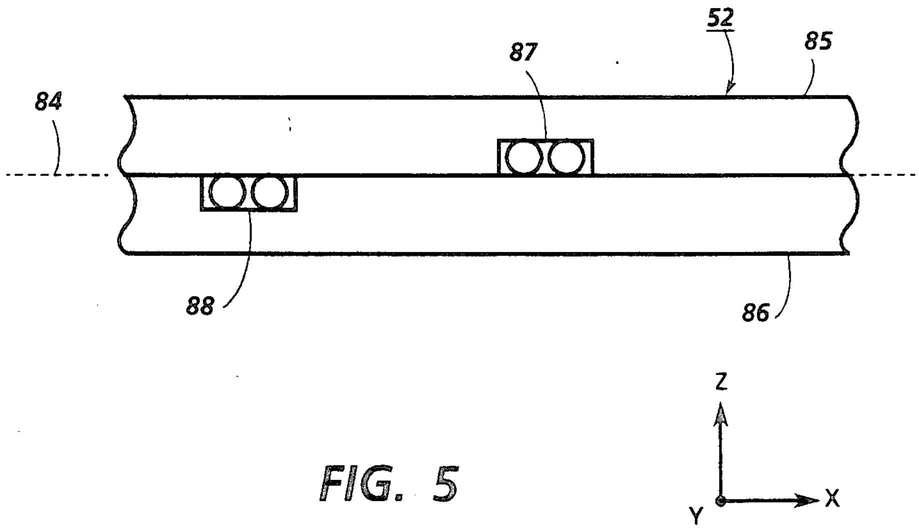
FIG. 5 is an alternate embodiment of the invention as view along line 4—4 of FIG. 3.

FIGS. 4 and 5 are views taken along view line 4—4 of FIG. 3 where FIG. 5 is an alternate embodiment of that of FIG. 4. The support board 52 is preferably made of a material which gives good mechanical stability. Grooves 80 and 81 are formed or machined in the support board for holding the pairs of output fibers, the depth of the grooves being such that the fiber free ends are tangent to the XY plane 84. Support board 52 shown in FIG. 5 as an alternate embodiment comprises two substrates 85 and 86 with grooves 87 and 88 respectively machined therein, the grooves being to a depth such that the free ends of the output fibers are tangent to the XY plane 84, substrates 85 and 86 are fastened together such that their interfacing surfaces lie at the XY plane 84 so that the pairs of output fibers are contiguous with the plane 84 even though they are not in the same plane. As well known in the art, the multiple sensors share common electronics. As explained earlier, the microprocessor or controller 36 drives or strobes the LED 58 by issuing commands to turn on the pulse generator 59. During calibration, the light sources are turned on steady or at least held on steady for many droplet periods. Each time the LED is energized by the controller, light is pumped simultaneously into every input fiber for each of the nozzles in the printer. On the output side, each of the similar fibers from the multiple sensor are tied to the same photodiode, the controller 36 calibrates the plurality of nozzles one at a time, for example, the far left nozzle in the array is calibrated first, and then the second and so on until the far right nozzle is calibrated. At each nozzle the voltage is applied to the charging electrode 42 until the $\Delta X$ position errors are reduced to zero by the servo loop monitoring and feed back mechanism. The sagittal or $\Delta Y$ misdirection is measured and used to delay the data to the charge electrode, so that no print error results. Thus, the $\Delta Y$ is only figuratively reduced to zero. If the two dimensional, differential sensing sensors are positioned on the odd numbered sensors and the prior art stitch sensors are positioned for the even numbered sensors, then a larger than nominal ratio of the deflection voltage required to reach the sagittal null position with that required to reach the stitch position indicates a high jet on odd channels and a low jet on even channels. The greater/lesser voltage and the high/low droplet is reversed depending on the angle $\theta$ of the sagittal sensor with respect to vertical position sensor, i.e., from the upper left or upper right.

Other objects and features of the invention will be apparent to those skilled in the art from a reading of the specification and from the drawings. Such modifications are intended to be included within the scope of the present invention.

We claim:

1. A two-dimensional, differential sensing sensor for sensing the position of ink droplets passing thereby relative to the droplets desired trajectory in both the horizontal and vertical direction therefrom, comprising:

means for directing a first beam of light to receiving ends of a first pair of transmitting channels, each opposite end of the first pair of channels being respectively coupled to first and second photodetectors, each photodetector producing an output signal upon receipt of light.

means for directing a second beam of light to receiving ends of a second pair of light transmitting channels, each opposite end of the second pair of channels being respectively coupled to third and fourth photodetectors, each photodetector producing an output signal upon receipt of light;

first differential circuitry for receiving the output signals from the first and second photodetectors;

second differential circuitry for receiving the output signals from the third and fourth photodetectors;

the first beam of light and its associated receiving ends of the first pair of channels being inclined with respect to the second beam of light and its associated receiving ends of the second pair of channels, so that the position of the ink droplets passing concurrently through the first and second light beams may be determined in both the horizontal and vertical direction relative to the desired droplet trajectory by the first and second differential circuitry.

2. A two-dimensional, differential sensing sensor in a continuous stream ink jet printer having a printhead with a plurality of nozzles from which streams of ink droplets are ejected towards a moving recording medium, the differential sensing sensor monitoring the ink droplets from at least one nozzle during their flight to the recording medium or collecting gutter, said monitoring being concurrently in both the mutually perpendicular droplet deflection plane and the printing plane on the surface of the moving recording medium, the differential sensing sensor comprising:

first and second input optical fibers, each having an associated pair of adjacent output optical fibers, the free ends of the input fibers being confrontingly aligned, but spaced from the free ends of their associated pairs of output fibers, the input fibers and pairs of output fibers being separated by the ink droplet deflection plane, the second input fiber and associated pair of output fibers being inclined with respect to the first input fiber and associated pair of output fibers;

first and second differential circuit means electrically coupled to respective pairs of output fibers via respective pairs of photodetectors, the first and second circuit means indicating the location of the ink droplets relative to a bisector of the respective associated pair of output fibers; and the first and second input fibers, together with their associated pairs of output fibers, lying substantially in or contiguous with the same plane, this same plane being perpendicular to the droplet deflection plane, so that each sensed droplet position may be concurrently determined relative to both the droplet deflection plane and the printing plane by said differential sensing sensor as it travels along a flight path therepast towards the recording medium or gutter.

3. A two dimensional, differential sensing optical sensor in an ink jet printer of the continuous stream type, the optical sensor enabling the concurrent monitoring and positioning of the ink droplets in both the plane of droplet deflection and in the plane perpendicular thereof, in an x, y, z coordinate system, the deflection plane being the xz plane and the plane perpendicular thereto being by the xy plane, the printer having a printhead that directs streams of ink droplets in the z direction from a plurality of nozzles therein towards a recording medium having a printing plane in the xy plane, the printhead having means for separately charging the individual droplets of each stream at the region of droplet formation in accordance with digitized data signals from a controller and means for deflecting the droplets substantially in said xz plane for printing the droplets on the recording medium along a lineal segment of the width thereof per nozzle or for directing the droplets to a gutter, so that the droplets are fanned from each nozzle in a manner that places their endmost droplets of each respective printed segment adjacent the endmost droplets of the printed segment from adjacent nozzles, the optical sensor comprising:

a first input optical fiber for emitting and directing light from one end thereof, the light being received from a light source coupled to the opposite end thereof;

a first pair of output optical fibers having coplanar adjacent ends for receiving the light directed from the first input fiber and having opposite ends thereof coupled respectively to a first pair of photodetectors, the receiving ends of the first pair of output fibers confronting and being spaced from the light directing end of the first input fiber, the confronting ends of the input and output optical fibers being on opposite sides of the droplet deflection plane;

a first differential circuit means electrically coupled to the first pair of photodetectors for indicating the location of an ink droplet relative to a bisector between the receiving ends of the first pair of output fibers;

a second input optical fiber inclined to the first input fiber for emitting and directing light from one end thereof, the light being received from the light source coupled to the opposite end thereof;

a second pair of output optical fibers inclined to the first pair of output optical fibers having coplanar adjacent ends for receiving the light directed from the second input fiber and having opposite ends thereof coupled respectively to a second pair of photodetectors, the receiving ends of the second pair of output fibers being aligned with and spaced from the light directing end of the second input fiber, the aligned ends of the input and output optical fibers being on opposite sides of the droplet deflection plane;

a second differential circuit means electrically coupled to the second pair of photodetectors for indicating the location of an ink droplet relative to a bisector between the receiving ends of the second pair of output fibers; and the first input and output fibers and the second input and output fibers lying substantially in or contiguous with the same plane, this plane being perpendicular to the droplet deflection plane, so that the droplet position may be determined in both the x and y directions as it travels along a flight path towards the recording medium past the optical sensor.

* * * * *